(12) United States Patent
Fensore (10) Patent No.: US 9,370,064 B2
(45) Date of Patent: Jun. 14, 2016

(54) LED DRIVER HAVING NON-LINEAR COMPENSATION

(75) Inventor: David James Fensore, New Gloucester, ME (US)

(73) Assignee: NATIONAL SEMICONDUCTOR CORPORATION, Santa Clara, CA (US)

( * ) Notice: Subject to any disclaimer, the term of this patent is extended or adjusted under 35 U.S.C. 154(b) by 1091 days.

(21) Appl. No.: 13/267,156

(22) Filed: Oct. 6, 2011

(65) Prior Publication Data

US 2013/0088171 A1    Apr. 11, 2013

(51) Int. Cl.
*H05B 37/02*     (2006.01)
*H05B 33/08*     (2006.01)

(52) U.S. Cl.
CPC ........ *H05B 33/0818* (2013.01); *H05B 33/0827* (2013.01); *Y02B 20/347* (2013.01)

(58) Field of Classification Search
CPC .. H05B 33/086; H05B 33/0827; H05B 37/02; H05B 33/0818; H05B 33/083; H05B 37/0254
USPC .............. 315/360–362, 307–309, 291, 209 R
See application file for complete search history.

(56) References Cited

U.S. PATENT DOCUMENTS

| 7,920,111 | B2 | 4/2011 | Abdulaev et al. |
| 2008/0079371 | A1 | 4/2008 | Kang et al. |
| 2008/0231589 | A1 | 9/2008 | So et al. |
| 2009/0009105 | A1* | 1/2009 | Sakurai ................ 315/291 |
| 2009/0179848 | A1* | 7/2009 | Schmidt et al. .......... 345/102 |
| 2010/0308748 | A1 | 12/2010 | Sulaiman et al. |

FOREIGN PATENT DOCUMENTS

| CN | 1934614 A | 3/2007 |
| CN | 101425273 A | 5/2009 |
| WO | 2005093703 A1 | 10/2005 |

OTHER PUBLICATIONS

Dahlquist et al. ("Numerical Methods in Scientific Computing, vol. I", SIAM 2008).*
Blejec, Andrej, "Bézier Curves: Simple Smoothers of Noisy Data", Developments in Statistics and Methodology, Metodološki zvezki, 9, Ljubljana: FDV 1993.*
Chinese Office Action dated Mar. 3, 2015 (14 pages).

* cited by examiner

*Primary Examiner* — Haissa Philogene
*Assistant Examiner* — Amy Yang
(74) *Attorney, Agent, or Firm* — Andy Viger; Frank D. Cimino

(57) ABSTRACT

A device driver which includes an input driver configured to produce a sequence of uncompensated drive signals along with compensation circuitry connected to receive the uncompensated drive signals and to produce corresponding compensated drive signals. The compensation circuitry is capable of storing two or less control points that define a single compensation curve such as a Bezier curve, with the compensation circuitry converting the uncompensated drive signals to the corresponding compensated drive signals utilizing the control points. An output driver is configured to drive a device such as one or more light emitting diodes to be connected to the output driver with the compensated drive signals.

13 Claims, 6 Drawing Sheets

LED DRIVER HAVING NON-LINEAR COMPENSATION

BACKGROUND OF THE INVENTION

1. Field of the Invention

The present invention relates generally to light emitting diode (LED) driver circuitry and in particular to LED driver circuitry that utilizes brightness control having non-linear compensation circuitry.

2. Description of Related Art

Figure 1:
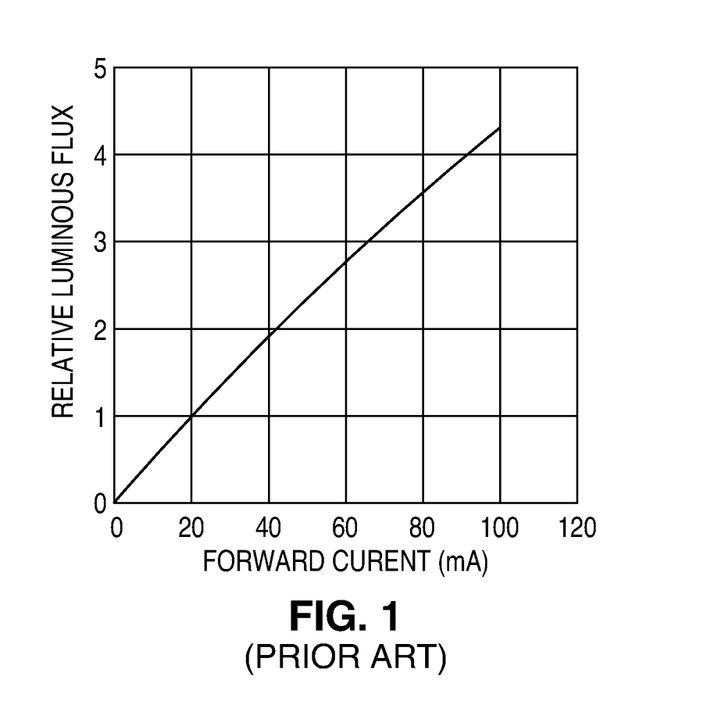
FIG. 1 is a graph of a typical LED showing forward current versus relative luminous flux.

Light emitting diodes have many applications, including backlighting for liquid crystal displays (LCDs). A typical backlight system may introduce non-linearities between a requested brightness and the actual light output. FIG. 1 is a graph from a typical LED data sheet depicting the forward current of the LED versus the relative luminous flux. As can be seen, the luminous output does not increase linearly with the forward current. By way of example, for a forward current value of 20 mA, the relative luminous flux value is 1 but when the current is increase by a factor of four (80 mA), the flux value is only at 3.5.

Figure 2:
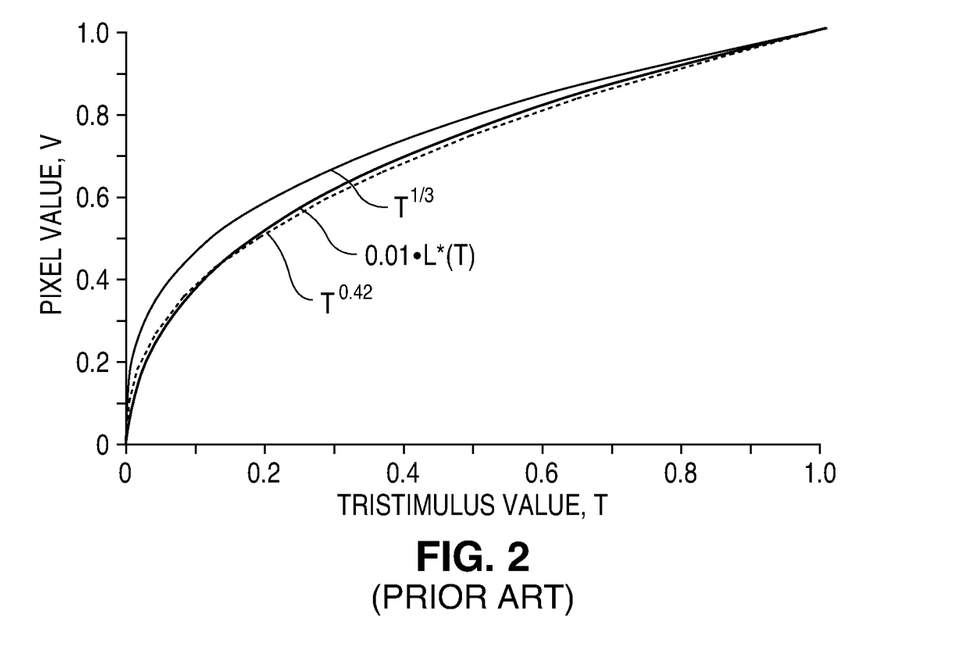
FIG. 2 a graph of a model of human vision response to lightness showing that the response is non-linear.

In addition to non-linearities introduced by the LEDs themselves, there are issues relating to non-linearities of human perception. FIG. 2 includes a set of curves taken from "Perceptual Uniformity of Digital Imaging" by Charles Poynton (2010), which illustrate the non-linear human response to various levels of light. Among the curves is a curve labeled 0.01 L*(T) which is based on the CIE L* model of human response to lightness produced by the International Commission on Illumination. As can be seen from these curves, the human perception of light increases dramatically for changes at lower light levels and becomes relatively linear at higher levels.

For many LED drive applications, tight control of LED linearity is important. By way of example, in Content Aware Backlight Control (CABC) applications (sometimes also referred to as Content Adaptive Brightness Control), the LED backlighting brightness is intelligently controlled by analyzing the LCD content. Although this technique reduces power consumption, the LCD pixel brightness must be precisely matched by the changes in the LED backlight brightness. Non-linearities in the backlight system can make this matching more difficult.

In some applications, it is desirable to control the backlighting in a manner such that the LEDs are ramped up and dimmed in a non-linear manner. By way of example, a pleasing diming action can be produced by turning the back lighting off starting at a fast rate and ending at a much slower rate. Other logarithmic or exponential functions for backlighting control are sometimes desired.

Prior art approaches to compensating for non-linearities and for creating non-linearities frequently use a look-up table of one form or another. The problem with this approach is that a large number of look-up table points must be used to achieve a reasonable degree of compensation accuracy thereby making programming relatively difficult and requiring an increased amount of memory. Hardcoded look up tables are more space efficient but provide less application flexibility. Analog solutions generally do not provide programmability to support multiple curve shapes.

There is a need for improved LED drive circuitry having non-linear compensation that can provide precise compensation, can be easily re-programmed and which enables multiple compensation curves to be easily implemented. As will become apparent to those skilled in the art upon a reading of the following Detailed Description of the Invention together with the drawings, the present invention successfully addresses these short comings of the prior art.

DETAILED DESCRIPTION OF THE INVENTION

Figure 3:
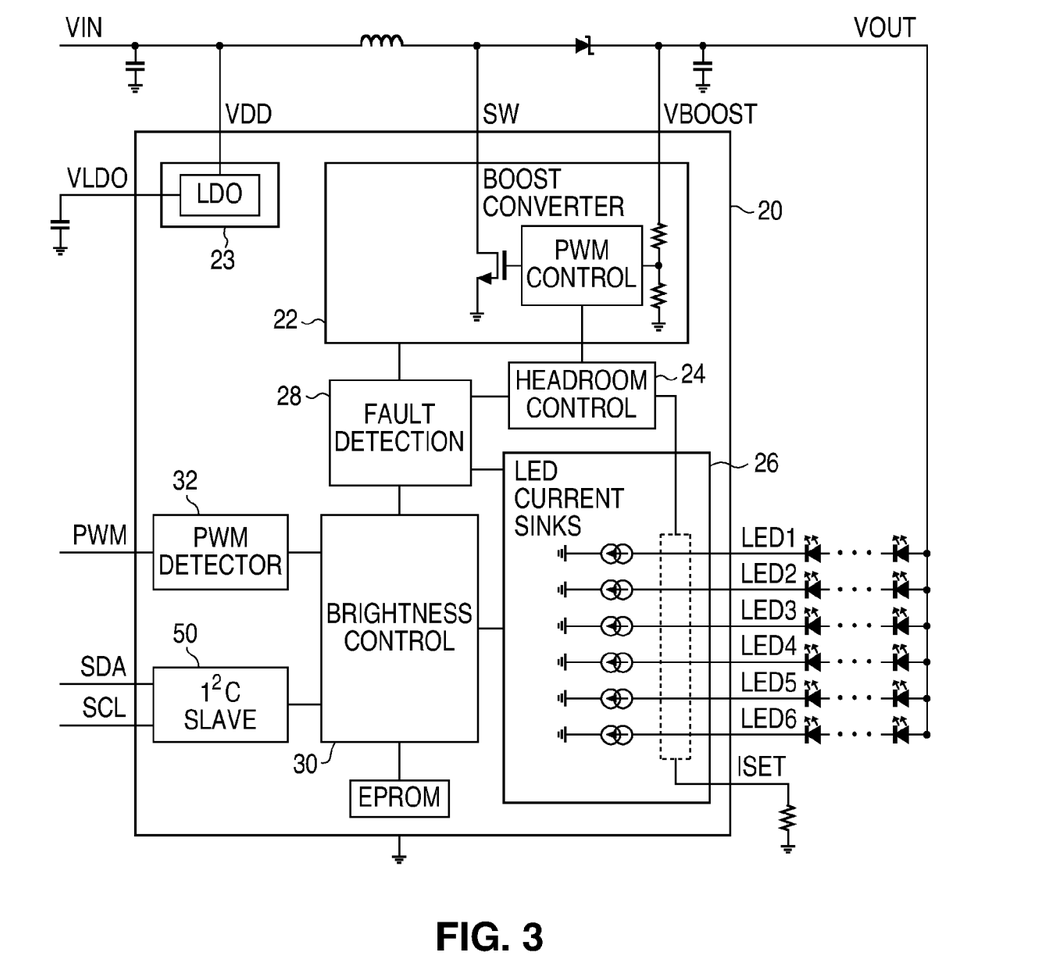
FIG. 3 is a block diagram of an LED backlight driver integrated circuit product which utilizes non-linear compensation circuitry in accordance with one aspect of the present invention.

Referring again to the drawings, FIG. 3 is a block diagram of a LED backlight driver integrated circuit product 20 along with associated external components. A switching boost DC-DC converter is provided for producing a variable output voltage Vout. An internal low drop out (LDO) linear voltage regulator 23 is included for providing operating voltages for the internal driver circuit components.

Vout is applied to the anodes of the outermost external LEDs located in the six LED banks LED1-LED6. Each LED bank is capable of driving one or more series connected LEDs. A head room control block 24 senses the LED drive voltage and causes the DC-DC converter to adjust the value of Vout to accommodate the LED block having the largest forward voltage plus a small voltage for headroom. Thus, the boosted output voltage Vout is sufficiently large to allow proper LED driving but not too large so as to waste power. An LED current sink block 26 includes six separate digitally controlled current sinks for precisely controlling the drive current though each of the LED banks. A fault detection block 28 operates to detect various faults, such as an open LED, along with over current and over voltage conditions.

Figure 4:
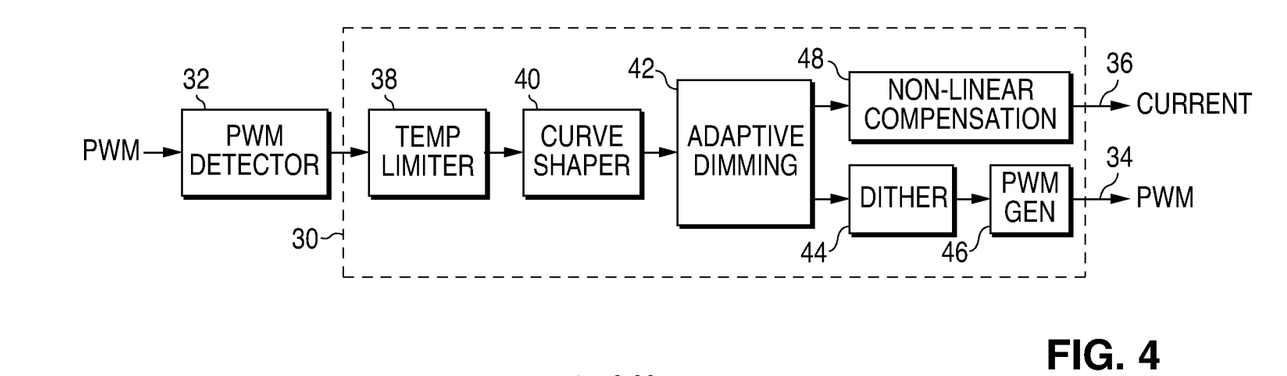
FIG. 4 is a diagram of an exemplary brightness control block used in the FIG. 3 circuit which utilizes non-linear compensation circuitry.

The brightness of the LEDs is controlled by a Brightness Control block 30 that allows various method of brightness control. Some details of the Brightness Control block are also shown in FIG. 4. The brightness can be controlled using 100% PWM control or 100% Current control or a combination of both. An external PWM signal is provided which is received by detector 32 which measures the duty cycle of the signal and produces a 12 bit PWM value indicative of the measured value. That PWM value is used to produce the PWM signal on line 34 (FIG. 4) and also used to produce the 12 bit Current signal on line 36. The 12 bit PWM data are first passed through a Temperature Limiter block 38 and a Curve Shaper block 40. An Adaptive Dimming block 42 operates to select either 100% Current control, 100% PWM control or a combination of both for controlling LED brightness. Although many of the details of the Adaptive Diming block 42 are not relevant to the present invention, under some circumstances it has been found that improved performance can be achieved for using PWM control for low brightness levels and Current control for higher brightness levels. By way of example, for LED brightness up to 25% of the maximum value, brightness is controlled using PWM. For LED brightness above 25% to 100%, brightness is controlled using Current control where a 12 bit current value operates to control LED current using a digital-to-current level converter circuit.

When in the PWM mode of operation, the Adaptive Dimming block 42 produces a 12 bit signal which is passed through a Dither block 44 and is then converted to the PWM signal on line 34 by a PWM generator block 46. The Dither block permits the PWM signal to be dithered between two digital values to simulate a brightness level halfway between the two digital values. When in the Current mode of operation, the resultant 12 bit value from the Adaptive Dimming block 42 is passed though a Non-Linear Compensation block 48. Block 48 allows the 12 bit Current signal to be compensated in accordance with one aspect of the present invention. Such compensation may be for many purposes including, by way of example, compensation for any non-linear relationship between drive current and LED luminance as shown in FIG. 1 or compensation for human perceptual non-linearities as depicted in FIG. 2 for example. Further, such compensation may be for the purpose of introducing non-linearities to create the logarithmic or exponential ramping/dimming functions previously noted.

As will be explained, several different compensation curves can be effectively stored in Brightness Control block 30. An I²C compatible synchronous serial interface allows data corresponding to these curves to be easily programmed and reprogrammed. Two interface lines SDA (Serial Data Line) and SCL (Serial Clock Line) form a bus, with devices on the bus operating as a master, a slave or both. The LED driver in this example uses an I²C interface device 50 which operates as an I²C slave, as indicated in FIG. 3.

Figure 5:
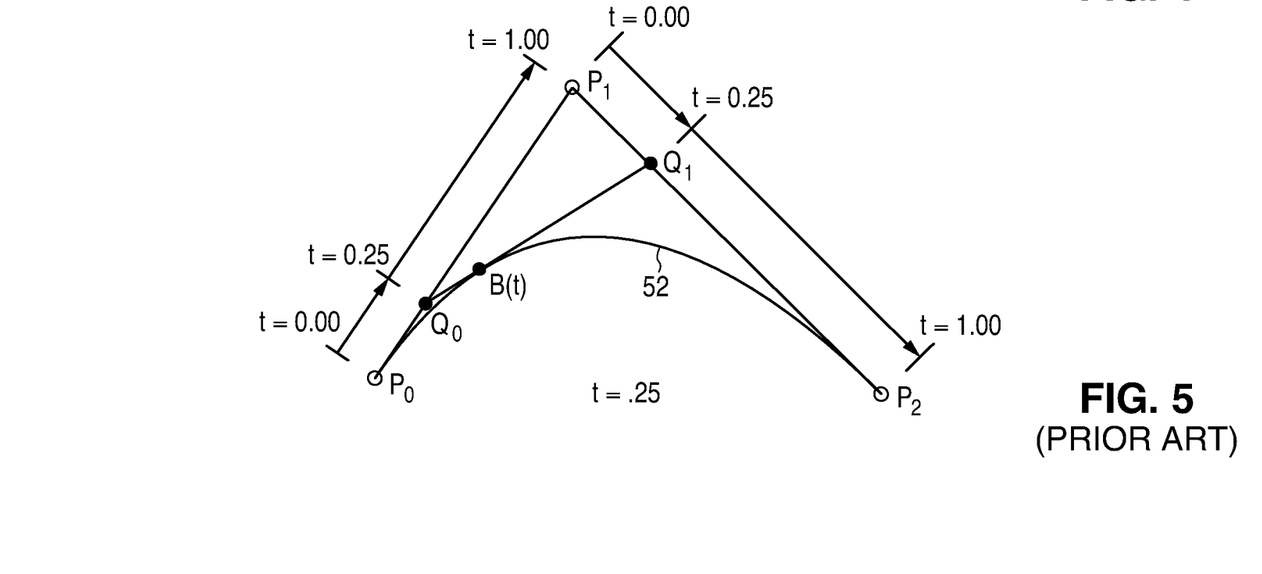
FIG. 5 is an example of a parametric quadratic Bezier curve of the type which can be utilized in the non-linear compensation circuitry of the FIG. 3 circuit.

One aspect of the present invention is the use of a parametric quadratic Bezier curve, an example of which is depicted in FIG. 5. As is well known, such a curve defines a path 52 between two points (such as $P_0$ and $P_2$) in terms of a control point (such as $P_1$) and a parameter such as t that varies between 0 and 1. The path (curve) 52 defined by these three points passes from point $P_0$ to point $P_2$ as t is increased from 0 to 1. A graphic explanation of the manner in which the Bezier curve 52 is produced may be helpful. A line $P_0$-$P_1$ includes a point $Q_0$ which is located at $P_0$ when t=0, with $Q_o$ moving from $P_0$ to $P_1$ as t increases to 1. Point $Q_0$ is shown at t=0.25. A second line $P_1$-$P_2$ includes a point $Q_1$ which is located at $P_1$ when t=0, with $Q_1$ moving from $P_1$ to $P_2$ as t increases to 1. Point $Q_1$ is also shown when parameter t is equal to 0.25. A further line defined by $Q_0$-$Q_1$ is coincident with line $P_0$-$P_1$ at t=0 and becomes coincident line $P_1$-$P_2$ at t=1.0. Function B(t) moves along a path tangent to line $Q_0$-$Q_1$ to produce curve 52. Thus, at t=0 when the curve 52 leaves point $P_0$ (at which time line $Q_0$-$Q_1$ is coincident to line $P_0$-$P_1$), the curve is tangent to line $P_0$-$P_1$ (and thus line $Q_0$-$Q_1$). When the curve arrives at point $P_2$ at t=1.0, curve 52 is tangent to line $P_1$-$P_2$ (and thus line $Q_0$-$Q_1$). Point B(t) is shown when t=0.25.

The quadratic Bezier function B(t) is as follows:

$$B(t)=(1-t)^2 P_0 + 2(1-t)t P_1 + t^2 P_2 \quad (1)$$

where parameter t varies from 0 to 1.

It is possible to generate compensation curves for use in LED driver applications using, by way of example, the Bezier function of equation (1). It is preferred that the compensation curves be normalized to a space between 0 and 1 for both the X and Y dimensions. In that case, point $P_0$ becomes (0,0) and point $P_2$ becomes (1,1). Thus, the Bezier function of equation (1) becomes simplified as follows:

$$B(t)=2(1-t)t P_1 + t^2 \quad (2)$$

where parameter t varies from 0 to 1.

Figure 6A:
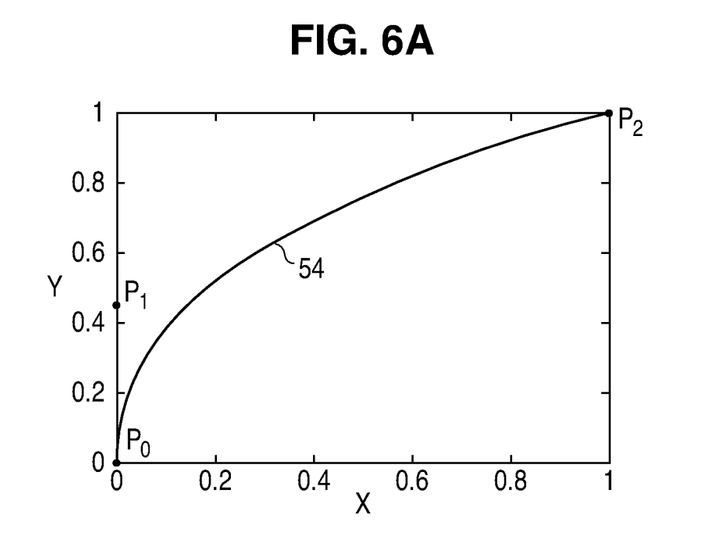
FIG. 6A shows an exemplary non-compensated curve similar to the human vision response of FIG. 2
Figure 6B:
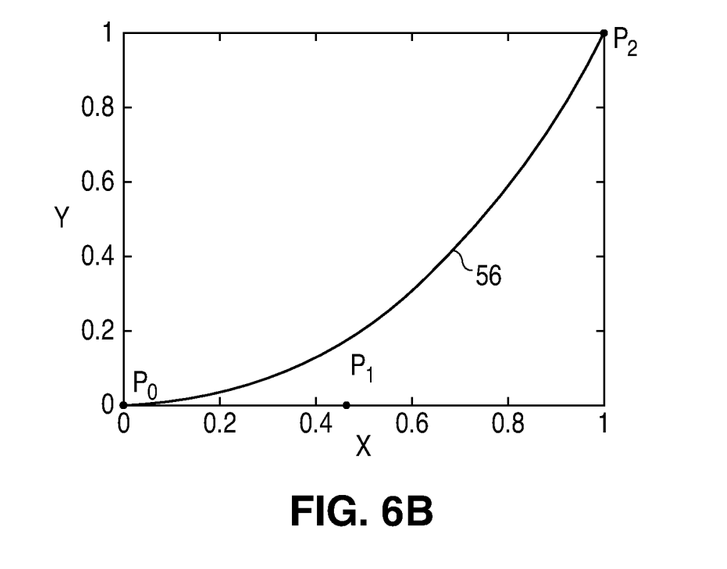
FIG. 6B shows a corresponding quadratic Bezier curve for compensating the FIG. 6A curve.

Equation (2) can be used to define the entire compensation curve in terms of the single control point $P_1$. An appropriate compensation curve can be readily selected using only P1 based upon the desired form of compensation. By way of example, a control point $P_1$ value can first be established that matches the uncompensated curve, such as the curves of FIG. 2 relating to perceptual non-linearities. FIG. 6A shows a Bezier curve selected to match one of the curves of FIG. 2. This can be carried out by various methods including selecting various values of $P_1$ by trial and error until a best fit is achieved. Given the nature of the Bezier function, it is possible to produce a relatively precise fit for many uncompensated curves. In this example, the control point is (0.00, 0.63) in terms of respective X and Y coordinates. Once $P_1$ has been established for the uncompensated curve, the control point $P_1$ for the corresponding compensation curve 56 shown in FIG. 6B is produced by simply interchanging the X and Y values. When data relating to the uncompensated curve 54 is combined with data relating to the compensation curve 56, the result is a linear response in this example. Compensation curve 56 can be effectively retained by storing the value of $P_1$ within the compensation circuitry of block 48 (FIG. 4). In the present example, the X and Y values each expressed by a 12 bit value.

Equation (2) can be rewritten in terms of X and Y as follows:

$$x_i = 2(1-t)t x_c + t^2 \quad (3)$$

and $$y_o = 2(1-t)t y_c + t^2 \quad (4)$$

where $x_c$ and $y_c$ are the fixed X and Y coordinates of the control point P1 of the compensation curve.

During operation, Non-linear Compensation block 48 (FIG. 4) receives an uncompensated LED drive signal in the form of a 12 bit value from the Adaptive Dimming block 42. In order to produce a corresponding compensated 12 bit LED drive signal, this 12 bit value is inserted into equation (3) as $x_i$, with $x_i$ being the input from the Adaptive Dimming block 42 provided to the Non-Linear Compensation block 48. Equation (3) is then solved to determine the corresponding value of parameter t, with parameter t defining the point on the compensation curve which corresponds to $x_i$. Once parameter t has been solved, it is substituted into equation (4) so that the corresponding 12 bit value of $y_0$ on the curve can be found. This compensated value of $y_0$ is then used to produce the 12 bit Current signal on line 36 (FIG. 4) to drive the LEDs.

Since a particular compensation curve can be expressed entirely by a single control point ($x_c$, $y_c$) comprising a total of only 12×2 bits (assuming 12 bit resolution), the non-volatile memory typically used to stored the control point is used efficiently.

One approach for performing the above-described arithmetic computations includes the use of logic circuitry. The hardware can be implanted using Verilog, a well known Hardware Design Language (HDL). Since the LED brightness update rate for $x_i$ is often much slower than the digital clock rate of the drive circuit, multi-cycle iterative math techniques can be used to reduce the size of the logic. By way of example, the multiply, divide and square root functions to be described in connection with FIG. 8 can all be implemented using multiple add/shift and/or subtract/shift operations. The bit depth of the computation is a parameter that can be changed at instantiation, with the default width for the data path being 12 bits in the present example.

In order to simplify the solution of equation (3), the equation can be rearranged as follows to allow the solving of parameter t:

$$x_i = (2t - 2t^2)x_c + t^2$$

or $$x_i = (1 - 2x_c)t^2 + 2x_c t$$

or $$0 = (1 - 2x_c)t^2 + 2x_c t - x_i \tag{5}$$

The standard quadratic equation is as follows:

$$t = [-b \pm (b^2 - 4ac)^{1/2}]/2a \tag{6}$$

Substituting the values for a, b and c from equation (5) into equation (6) results in the following solution for parameter t:

$$t = [-2x_c \pm [(2x_c)^2 - 4(1 - 2x_c)(-x_i)]^{1/2}]/2(1 - 2x_c) \tag{7}$$

Note that equation (7) can be further simplified by removing the factor 2 from the numerator and denominator and by eliminating the negative solution since t is constrained to vary from 0 to 1. Equation (7) then simplifies as follows:

$$t = [[x_c^2 + (1 - 2x_c)x_i]^{1/2} - x_c]/(1 - 2x_c) \tag{8}$$

Although input $x_i$ of equation (8) may change on a sample-by-sample basis, the following terms, will be constant since $x_c$ will be constant:

$$k_1 = x_c^2 \tag{9}$$

$$k_2 = 1 - 2x_c \tag{10}$$

As will be explained, the values of constants $k_1$ and $k_2$ can be generated and stored prior to receipt any input $x_i$ and are thus referred to as pre-computation constants. Substituting the values for $k_1$ and $k_2$ into equation (8) results in the following:

$$t = [[k_1 + k_2 x_i]^{1/2} - x_c]/k_2 \tag{11}$$

The simplification of equation (11) means that in order to compute a value for parameter t, the arithmetic operations required are one multiply, one add, one square root, one subtract and one divide. All of these operations can actually be implemented using only add, subtract and shift operations using iterative math, as will be explained.

Note that equation (11) will provide an unreliable result should the denominator $k_2$ go to zero. As indicated by equation (10), this occurs when the value of $x_c$ is equal to 0.5. Thus, when $x_c$ is equal to or near 0.5, the following alternative quadratic equation is used:

$$t = 2c/[-b \pm [b^2 - 4ac]^{1/2}] \tag{12}$$

Performing a similar set of transformations as was carried out above for equation (7) for the alternative quadratic equation (12), the value of t is as follows:

$$t = x_i/[[k_1 + k_2 x_i]^{1/2} + x_c] \tag{13}$$

where
  k1 and k2 are the same
    as defined in equations (9) and (10).

In the actual implementation, a choice is made between the two forms of equations (11) and (13), with equation (11) being used unless $x_c$ is greater than 0.25 and less than 0.75 in which case equation (13) is used. Note that the pre-computation constants $k_1$ and $k_2$ are the same for both cases.

Once parameter t has been computed, the output $y_0$ can be computed. The equation for $y_o$ is equation (4) above. Equation (4) can be reorganized as follows:

$$y_o = (1 - 2y_c)t^2 + 2ty_c \tag{14}$$

The following pre-computation constant can be used, given that value of $y_c$ for the control point does not change:

$$k_3 = 1 - 2y_c \tag{15}$$

Thus, equation (14) can be rewritten as follows:

$$y_o = k_3 t^2 + 2ty_c \tag{16}$$

Regrouping equation (16) results in the following:

$$y_o = t(tk_3 + 2y_c) \tag{17}$$

As indicated by equation (17), $y_o$ can be computed from parameter t using two multiplies, a shift and an add operation. Again, the multiply operations can be actually implemented using iterative math.

Figure 7:
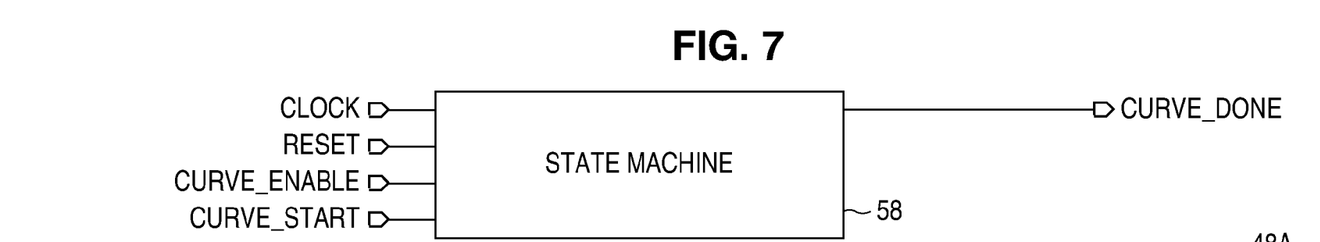
FIG. 7 is a state machine for controlling the arithmetic logic used to produce a compensated drive output.
Figure 8:
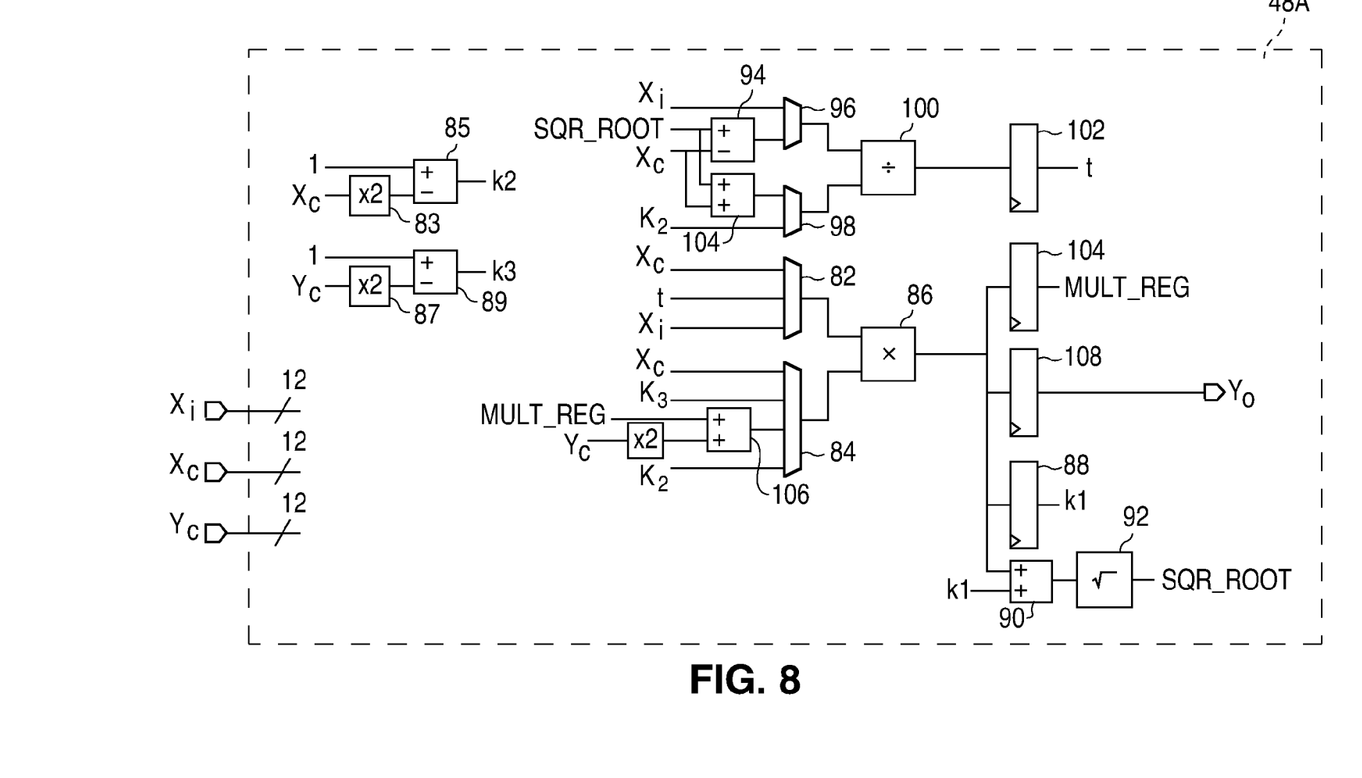
FIG. 8 shows the logic resources used to carry out the arithmetic operations in order to produce the compensated drive output.

FIG. 7 is a state machine 58 that controls the operation of the Non-Linear Compensation block 48 of FIG. 4. FIG. 8 depicts the various arithmetic logic resources available for first determining the value of the t parameter and then the curve output $y_o$. The inputs to the state machine 58 include a clock, a reset, a curve enable signal and a curve start signal. The inputs to the logic circuitry 48A of FIG. 8 include the 12 bit stored values $x_c$ and $y_c$ of the control point P1 that defines the particular compensation curve to be used.

Figure 9:
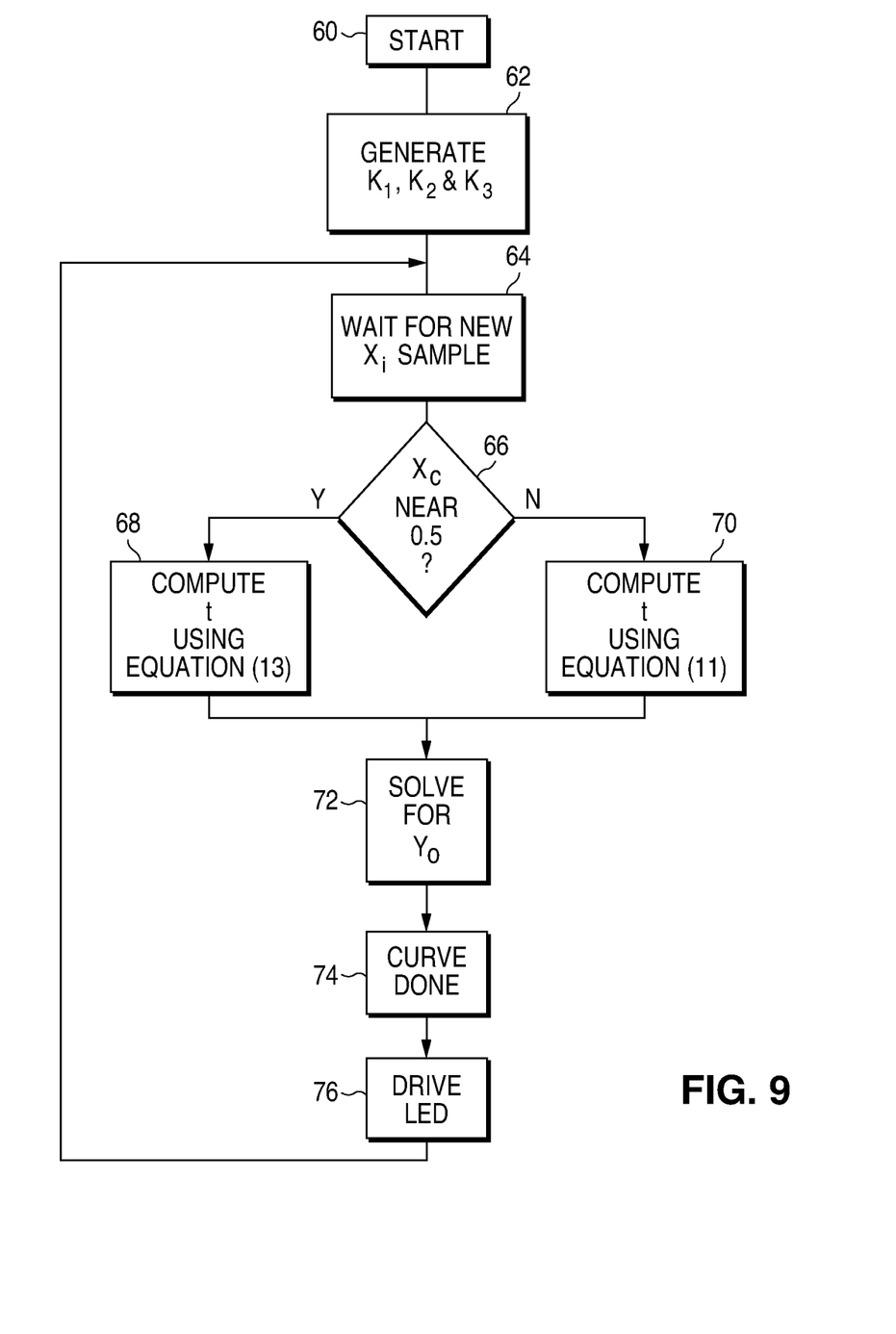
FIG. 9 is a flow chart illustrating how the state machine of FIG. 7 controls the FIG. 8 logic used to produce the compensated drive output.

FIG. 9 is a simplified flow chart illustrating the manner in which the State Machine 58 and logic 48A produce the compensated $y_o$ output utilizing the $x_i$, $x_c$ and $y_c$ inputs. As indicate by block 60, the computation commences once signal curve_enable is received. As indicated by block 62 of the flow chart, the three pre-computation values $k_1$, $k_2$ and $k_3$ are produced, with these values being based upon a particular control point $(x_c, y_c)$ but are independent of the uncompensated LED drive input $x_i$. These fixed values are stored and are used each time input $x_i$ is updated.

Pre-computation value $k_2$ is produced by multiplying value $x_c$ of the stored control point by two as indicated by block 83. The result is subtracted from the value of one as indicated by block 85 to arrive at $k_2$ in accordance with equation (10). Similarly, the pre-computation value $K_3$ is generated by first multiplying $y_c$ of the stored control point by two as indicated by block 87 and subtracting that product from the value of one as indicated by block 80 to arrive at $k_3$ in accordance with equation (15). As indicated by equation (9), the pre-computation value of $k_1$ is equal to $x_c^2$. One value of $x_c$ is provided to a multiplier circuit 86 by multiplexer (mux) 82 and a second value of $x_c$ is provided by mux 84, with the product $k_1$ being located in a holding register 88.

As indicated by block 64 of the flow chart, the state machine 58 then waits for the uncompensated drive input $x_i$ to be updated. Once that occurs, the value of $x_i$ is tested to determine if the value is near 0.5, that is, the value is between 0.25 and 0.75 as indicated by element 66 of the FIG. 9 flow chart. If so, alternative equation (13) is used to solve for parameter t, otherwise standard equation (11) is used as indicated by blocks 68 and 70 of the flow chart.

Assuming that equation (11) is to be used, the value of parameter t is then computed as indicated by block 70. This is carried out in multiple steps. First, term $k_2 x_i$ is produced by multiplying $k_2$, selected by mux 84, with $x_i$, selected by mux 82. The multiplication is carried out by multiplier 86. The term $k_2 x_i$ is then added to pre-computation constant $k_1$ provided by holding register 88 using adder 90. The square root of the sum is then taken as indicated by block 92 to produce a value $(k_1 + k_2 x_i)^{1/2}$ referred to as sqr_root.

Value sqr_root is then used to solve for parameter t in accordance with equation (11). A subtractor 94 produces a value at the output of mux 96 equal to the difference between sqr_root and $x_c$. A divider 100 is used to divide sqr_root by $k_2$, with $k_2$ being provided by mux 98. The quotient corresponds to equation (11) for parameter t, with the parameter being stored in a holding register 102.

In the event equation (13) is to be used (block 68 of FIG. 9), the value sqr_root is computed in the same manner previously described. Next, an adder circuit 104 operates to add $x_c$ and sqr_root, with the sum being provided to divider 100 by mux 98. The value $x_1$, which is provided by mux 96, is divided by $(x_c + \text{sqr\_root})$ using divider 100 to produce parameter t in accordance with equation (13). Once again, the parameter t value is stored in register 102.

As indicated by block 72, the value of parameter t is then used to solve for the compensated drive output $y_o$ in accordance with equation (17). First, the previously computed value for parameter t, selected by mux 82, is multiplied by pre-computation constant $k_3$ selected by mux 84. Multiplication is carried out by multiplier 86, with the product $tk_3$ being held is register 104 as value mult_reg. The value $y_c$ is again doubled by ×2 multiplier 91, the product added to the value of multi_reg using adder 106 and the sum is selected by mux 84. Parameter t is selected by mux 82, with the outputs of the two muxes being multiplied by multiplier 86. The product is $t(tk_3 + 2y_c)$ in accordance with equation (17), which represents value $y_o$ which is the compensated value for the uncompensated input value $x_i$. The 12 bit value for $y_o$ is held in register 108. That completes the computation of the compensated output $y_o$ derived from the uncompensated input $x_o$ as indicated by block 74. The value of $y_o$ is then used to drive the LEDs (block 76) until a new value of $x_i$ is received. When that occurs, the sequence proceeds from block 64 of the FIG. 9 flow chart so that a new value of $y_o$ can be computed.

Thus, a single control point P1 can be used to define a wide family of curves which can be computed to at least the 12 bit accuracy of the uncompensated drive input $x_i$ from the Adaptive Dimming block 42 (FIG. 4) without resorting to interpolation.

Is has been found that parameterized quadratic Bezier curves of equation (1) provide adequate compensation accuracy for most applications, with the single control point P1, comprising two 12 bits data points, being easily stored in non-volatile memory. Multiple control points can be easily stored to provide multiple compensation curves if desired. Bezier curves of a higher order, such as cubic Bezier curve, could be used. A cubic Bezier curve can be defined by a two control points so that such a curve can be used. However, the use of higher order Bezier curves is typically not required for matching most uncompensated driving signals and the use of such curves is at the expense of increased computational complexity and increased data storage requirements. Note also that the $I_2C$ interface of FIG. 3 can be used to program and reprogram the control point data $x_c$ and $y_c$. In addition, although the compensation provided in the forgoing example results in an overall linear response, in some applications the desired compensated response is non-linear. Thus, as previously mentioned, the present invention can also be used to create logarithmic or exponential ramping/dimming functions.

Thus, a novel approach for compensating a LED drive signal has been described. Although one embodiment has be described in some detail, it is to be understood that various changes can be made by those skilled in the art without departing from the spirit and scope of the present invention as defined by the appended claims. By way of example, although the present invention has been described in connection with driving LEDs, it would also be possible to provide compensation for driving other types of devices.

What is claimed is:

1. A device driver circuit suitable for driving a device characterized by a non-linear response to drive signals, comprising:
    driver input circuitry configured to produce uncompensated drive signals ($x_i$) associated with a device non-linear response curve;
    compensation circuitry configured to receive the uncompensated drive signals ($x_i$), and to produce corresponding compensated drive signals ($y_o$) based on a parametric quadratic Bezier function B(t) with an associated compensated device drive curve, where B(t) is characterized by
        a fixed start point and a fixed end point corresponding respectively to minimum and maximum values for ($x_i$, $y_o$) on the compensated device drive curve, and
        a pre-defined control point $P_1$ characterized by coordinates ($x_c$, $y_c$), used to generate the compensated drive signals ($y_o$) according to B(t),
        a parameter t with a range corresponding to a normalized value from 0 to 1;
    the compensation circuitry including compensation arithmetic logic that instantiates a parameter function, and an output function,
        the parameter-function arithmetic logic generates, in response to at least ($x_i$) and ($x_c$), a corresponding parameter t value on the compensated device drive curve, according to B(t), and
        the output-function arithmetic logic generates, in response to at least the resulting parameter t value and ($y_c$), the corresponding compensated drive signal $y_o$, according to B(t); and
    driver output circuitry configured to drive the device based on the compensated drive signals ($y_o$).

2. The circuit of claim 1 wherein the parametric Bezier function is a cubic function with two control points $P_1$ and $P_2$.

3. The circuit of claim 1 wherein the quadratic Bezier curve may be expressed as $x_i = 2(1-t)tx_c + t^2$ and $y_o = 2(1-t)ty_c + t^2$.

4. The circuit of claim 3,
    wherein the parametric-function arithmetic logic includes one multiply, one add, one square root, one subtract and one divide; and
    wherein the output-function arithmetic logic includes two multiplies, one shift, and one add.

5. The circuit of claim 1 wherein the device is at least one light emitting diode (LED), wherein the uncompensated drive signals are forward currents for driving the at least one LED, and wherein the device non-linear response curve corresponds to human perceptual response to LED luminance.

6. The circuit of claim 1 wherein the uncompensated drive signal ($x_i$) and the compensated drive signal ($y_o$) are digital signals with substantially the same bit accuracy.

7. The circuit of claim 1 wherein the compensation circuitry stores the control point P1 coordinates ($x_c$, $y_c$), and one or more constants $k_n$ derived from ($x_c$, $y_c$).

8. The LED driver of claim 1, wherein the uncompensated drive signals are forward currents for driving the at least one LED, and wherein the device non-linear response curve corresponds to human perceptual response to LED luminance.

9. An light emitting diode (LED) driver suitable for driving an LED characterized by a non-linear response to drive signals with compensation, said LED driver comprising:
   driver input circuitry configured to produce uncompensated drive signals ($x_i$) associated with an LED non-linear response curve for at least one LED;
   compensation circuitry configured to produce compensated drive signals for the at least one LED from the uncompensated drive signals ($x_i$), and to produce corresponding compensated drive signals ($y_o$) based on a parametric quadratic Bezier function B(t) with an associated compensated device drive curve, where B(t) is characterized by
      a fixed start point and a fixed end point corresponding respectively to minimum and maximum values for ($x_i$, $y_o$) on the compensated device drive curve, and
      a pre-defined control point $P_1$ characterized by coordinates ($x_c$, $y_c$), used to generate the compensated drive signals ($y_o$) according to B(t),
      a parameter t with a range corresponding to a normalized value from 0 to 1;
   the compensation circuitry including compensation arithmetic logic that instantiates a parameter function, and an output function,
      the parameter-function arithmetic logic generates, in response to at least ($x_i$) and ($x_c$), a corresponding parameter t value on the compensated device drive curve, according to B(t), and
      the output-function arithmetic logic generates, in response to at least the resulting parameter t value and ($y_c$), the corresponding compensated drive signal $y_o$, according to B(t); and
   driver output circuitry configured to drive the at least one LED with the compensated drive signal.

10. The LED driver of claim 9 wherein the parametric Bezier function is a cubic function with two control points $P_1$ and $P_2$.

11. The LED driver of claim 10 wherein the uncompensated drive signal ($x_i$) and the compensated drive signal ($y_o$) are digital signals with substantially the same bit accuracy.

12. The LED driver of claim 9 wherein the quadratic Bezier curve may be expressed as $x_i = 2(1-t)tx_c + t^2$ and $y_o = 2(1-t)ty_c + t^2$ and wherein the compensating circuitry operates to calculate a value of parameter t for a given value of $x_i$ using $x_c$.

13. The LED driver of claim 9,
   wherein the parametric-function arithmetic logic includes one multiply, one add, one square root, one subtract and one divide; and
   wherein the output-function arithmetic logic includes two multiplies, one shift, and one add.

* * * * *